2,564,173

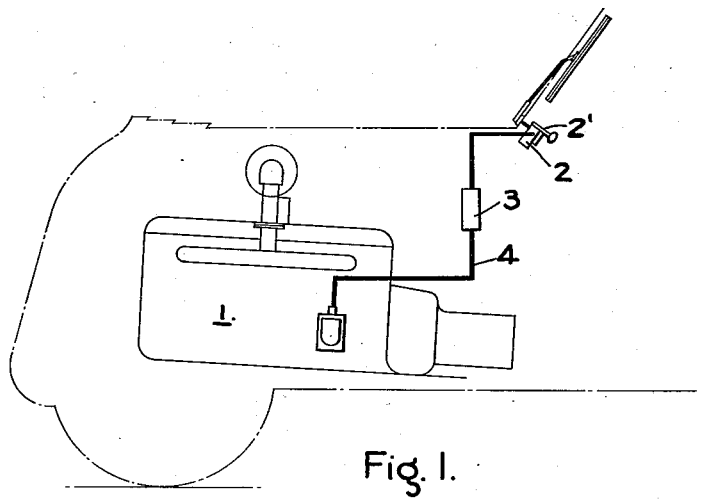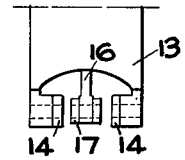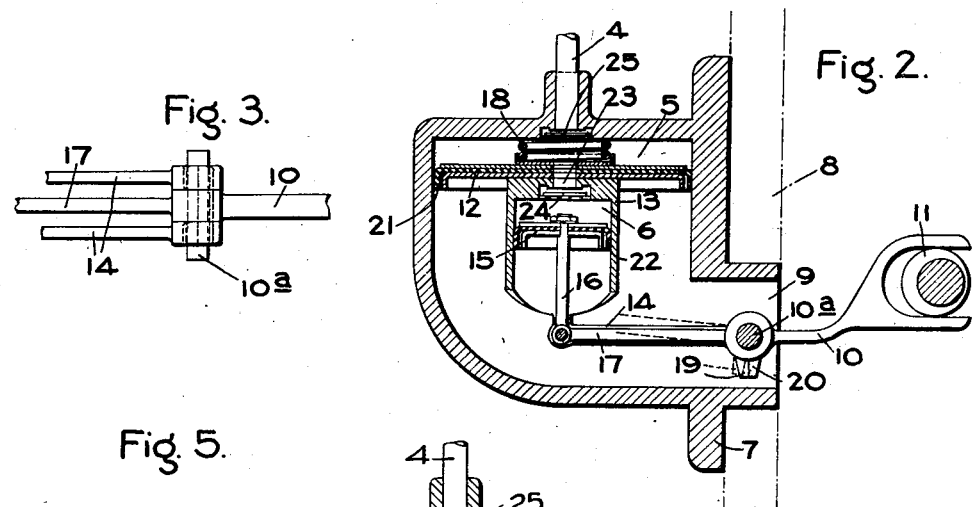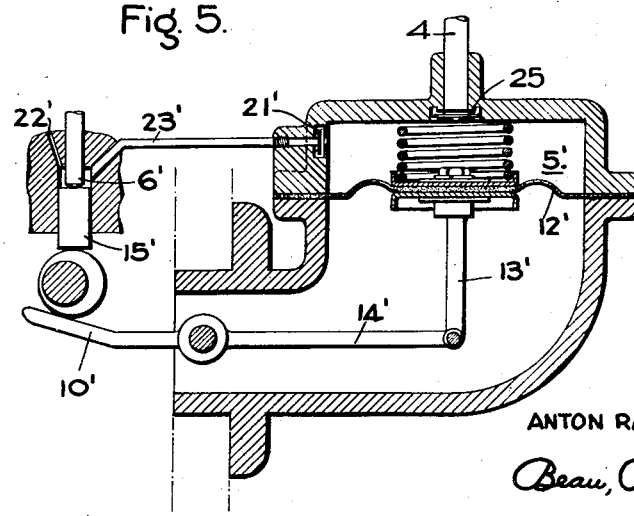
Aug. 14, 1951    A. RAPPL ET AL    2,564,173
MOTOR VEHICLE ACCESSORY SYSTEM AND PUMP THEREFOR
Filed March 3, 1944
INVENTOR
ANTON RAPPL AND ERWIN C. HORTON
BY
*Bean, Brooks, Buckley & Bean*
ATTORNEYS Patented Aug. 14, 1951

UNITED STATES PATENT OFFICE 2,564,173

MOTOR VEHICLE ACCESSORY SYSTEM AND PUMP THEREFOR

Anton Rappl, Eggertsville, and Erwin C. Horton, Hamburg, N. Y., assignors to Trico Products Corporation, Buffalo, N. Y.

Application March 3, 1944, Serial No. 524,932

7 Claims. (Cl. 60—60)

This invention relates to a motor vehicle and primarily to an accessory system therefor.

For the operation of certain automobile accessories, the intake manifold of the motor vehicle engine has been utilized as a source of suction, and this source has been supplemented, in some instances, by a vacuum pump driven by the cam shaft. The vacuum pump, while designed for part time operation, as when the accessory is being used, is nevertheless being operated constantly even when the accessory is not in use because of the fact that the pump is acting on a constant body of air which alternately rarifies and compresses in a pulsating manner without air movement through the pump.

An object of the present invention is to provide an accessory system in which its vacuum pump will be withdrawn from operation when the accessory is not in use, thereby to avoid the continued and unnecessary operation of the pump during such idle intervals.

A further object of the invention is to provide an accessory system wherein the accessory, such as a windshield cleaner, will be fluid held in its parked position, while at the same time the use of its suction pump is discontinued.

In the drawing

Fig. 1 is a diagrammatic illustration of a motor vehicle equipped with the improved accessory system;

Fig. 2 is a sectional view of a vacuum pump unit employed in the system;

Fig. 3 is a fragmentary plan view of the pump lever;

Fig. 4 is a fragmentary elevation of the secondary pump; and

Fig. 5 is a sectional showing, more or less schematic, depicting a modified form of pump unit.

Referring more particularly to the drawing, the numeral 1 indicates the internal combustion engine of a motor vehicle having an accessory motor 2, as for a windshield cleaner, or a window operating system, or any other accessory system which is designed for fluid pressure operation at intervals. Preferably the accessory is of the vacuum operated type, and the system may incorporate a suction storage tank 3 in the suction line 4 between the accessory motor and the source of suction.

In accordance with the present invention, the source of suction comprises a primary pump having a chamber 5 and a secondary pump provided with a chamber 6. In the preferred embodiment the two pumps are constructed as a unit, a flange 7 mounting the combined pump unit on the side of the engine crankcase 8. Both pump chambers communicate with the interior of the crankcase through a throat 9 and in this throat, or nearby, the pump actuating lever 10 is fulcrumed at 10a for being acted upon by the engine cam shaft 11. The piston 12 of the primary pump has its rod 13 connected to a free arm 14 of the pump lever, while the piston 15 of the secondary pump has its rod 16 connected to a fixed arm 17 of the lever. As illustrated, the secondary pump chamber 6 is formed in the piston rod 13 and the free arm 14 is composed of two parts which straddle the fixed arm 17 and are connected to the tubular piston rod 13 at opposite sides of the piston rod 16.

A spring 18 acting on the primary piston serves to actuate the latter on its suction stroke while the lever 10 operates it on the exhaust stroke, and for this purpose the free arm 14 and the power arm of the lever have cooperating shoulders 19 and 20, respectively, which abut each other on the exhaust stroke or when the primary piston is below its uppermost or normally idle position. This abutment will cause the lever 10 to elevate the primary piston upwardly for exhausting another increment of air from the chamber 5. The discharge of air may take place through suitably valved outlet means such as is provided by the cup packing flange 21 on the piston 12. Likewise, the outlet valve for the secondary pump will comprise the cup packing flange 22 on the secondary piston 15.

The volumetric displacement of the secondary piston is insufficient to operate the accessory in a practical manner, its purpose being to supply enough vacuum to hold the large piston out of action when the accessory is not being used. To this end the secondary pump chamber 6 communicates through an inlet orifice 23 with the primary pump chamber 5, a check valve 24 being arranged to provide one way air flow therefrom. The primary pump chamber is also provided with an inlet check valve 25 for air flow from the accessory.

When the accessory is operating, the spring 18 will move the primary piston on its air intaking stroke in a downward direction, as viewed in Fig. 2, and through the piston will serve to hold the shoulder 19 against the shoulder 20 for having the air exhausting stroke of the piston imparted by the constantly operating lever 10. Therefore the lever 10 and the spring 18 will cooperate to reciprocate the primary piston for the desired operation of the accessory. When the use of the accessory has been discontinued, as by closing the usual control valve 21, the air flow from the accessory will stop, and because of the capacity of chamber 5 a pulsation will develop without further evacuation. With this pulsation the primary piston will move short of a full intaking stroke with a resultant separation, though slight, of the shoulders 19 and 20. Therefore, the secondary pump will then begin to function and further rarify the air in the chamber 5 with a consequential further shortening of the primary piston intaking stroke, and this stroke shortening action will continue by reason of the pressure differential build-up against the action of spring 18 until the shoulder 19 has been fully withdrawn from the active path of the shoulder 20. Thereafter the secondary pump will continue to operate alone for providing sufficient negative pressure or suction to withhold the primary pump from operation. The negative pressure developed by this secondary pump will also serve to hold the windshield cleaner in its parked position, or to maintain the suction storage tank 3 practically evacuated when one is used in the accessory system.

In this connection it will be observed that while the secondary pump is practically inoperative while the primary pump is working, nevertheless as soon as the demand for the latter has been terminated the secondary pump will begin functioning and will gradually increase its fluid displacing stroke to its maximum for maintaining that degree of suction predetermined necessary for holding the primary pump inoperative. When the secondary pump is inoperative, its piston 15 will preferably be disposed in proximity to the upper end of the chamber 6 to avoid too large an air pocket which might tend to retard its ready response.

While the secondary pump is normally inoperative during accessory operation, nevertheless it may operate continuously as shown in the embodiment of Fig. 5 wherein the secondary piston 15' is in the form of one of the tappets of the engine valve mechanism which is suitably packed for effecting air displacement, the tappet chamber 6' being provided with an inlet passage 23' and an exhaust port 22'. A check valve 21' in the passage 23' directs the air flow from the primary pump chamber 5'. The primary piston 12', shown herein as a diaphragm, is connected by the piston rod 13' to a lever arm 14'. The outlet port 22' from the tappet chamber 6' has a suitable check valve (not shown). The tappet forming piston 15' has a relatively smaller volumetric displacement than the diaphragm piston 12' and will not interfere with the intended functioning of the latter. Its displacement however is sufficient to displace the lever 10' from the path of the cam 11 when the accessory system is not in use.

In the embodiment shown in Fig. 2 the secondary pump has a part-time operation, operating only when the accessory is inoperative, whereas in the modified showing in Fig. 5 the secondary pump has a full-time operation, but since its displacement is less than the primary pump, the latter will discharge through the secondary faster than the latter can displace fluid but without hindrance therefrom.

In both forms of the invention the primary pump is normally held out of operation by the secondary pump and is only brought into play when the accessory demands it, and while the foregoing description has been given in detail, it is to be understood that the inventive principles herein set forth are capable of assuming other physical embodiments without departing from the spirit of the invention or the scope of the appended claims.

What is claimed is:

1. Pump means for a fluid actuated accessory system having an accessory with a control valve, said pump means comprising a primary pump for connection to such an accessory, said primary pump having a spring-returned fluid displacing member operable back and forth, a drive for the pump having a part moving in a definite path for moving the displacing member against the spring urge, the fluid displacing member of the pump being movable from the active influence of the drive part by a spring counteracting fluid pressure influence, and a secondary pump of relatively smaller displacement operable by said drive part to supply such spring counteracting fluid pressure influence to the primary pump chamber for holding the first displacing member without the path of said drive part when the primary pump is inoperative.

2. An accessory system for motor vehicles, comprising a fluid pressure accessory having a control operable to apply the operating pressure to a pressure responsive member for moving the latter to a parked position, a pump operable from the power plant of the vehicle and having a fluid displacing member movable back and forth in a chamber for supplying the necessary pressure to the accessory for operating it, means operatively connecting the pump to the power plant of the vehicle for such operation and including a plant driven part and a separable part, the latter enabling the fluid displacing member of the pump being displaced from the active range of the plant driven part, and a secondary pump having a fluid displacing member movable back and forth in a chamber by said plant driven part and operating with a fluid displacement relatively smaller than the first pump and insufficient to actuate the accessory in a practical manner but sufficient to hold said fluid displacing member of the first pump so displaced when the accessory control is positioned to so park said pressure responsive member, said pump chambers having valved communication enabling evacation of the first pump chamber by the secondary pump.

3. An accessory system for motor vehicles, comprising an accessory having a control valve, a primary pump having a chamber and a co-operating fluid displacing member operable back and forth to actuate the accessory, a drive having a part moving in a definite path for imparting a positive air exhausting stroke to the fluid displacing member of the pump, resilient means acting to impart a return air intaking stroke to said fluid displacing member and yieldable to permit movement of the latter away from the path of the drive part, and a secondary pump operable by said drive part and acting to evacuate the chamber of the primary pump when the accessory is inoperative to so displace the fluid displacing member away from the path of the drive part.

4. An accessory system for motor vehicles, comprising a fluid actuated accessory having a control valve, a primary pump having a fluid displacing member operable back and forth in a chamber to supply the operating pressure for the accessory, a drive having a part moving in a definite path for imparting a positive stroke to said member, resilient means acting to impart a return stroke to said member, a secondary pump of relatively smaller displacement connected in series with the primary pump and operating to supplement the primary pump when the accessory is working and to evacuate the chamber to render the primary pump inoperative when the control valve is closed, said resilient means yielding to permit said fluid displacing member responding to the pressure differential when the chamber is so evacuated thereby to withdraw itself from the path of the drive part, and a common actuator for both pumps.

5. An accessory system for motor vehicles, comprising a fluid actuated accessory having a control valve, a primary pump having a fluid displacing member operable back and forth in a chamber to supply the operating pressure for the accessory, a drive having a part moving in a definite path for imparting a positive stroke to said member, resilient means acting to impart a return stroke to said member, a secondary pump operating when the control valve is closed to evacuate the chamber to render the primary pump inoperative and connected to supplement the primary pump when the accessory is operative, said resilient means yielding to permit the movement of the fluid displacing member from the path of the drive part when the chamber is so evacuated, and a common actuator for both pumps.

6. An accessory system for motor vehicles, comprising a fluid actuated accessory having a control valve, a primary part-time pump having a fluid displacing member operable back and forth in a chamber to supply the operating pressure for the accessory, a drive having a part moving in a definite path for imparting a positive stroke to said member, resilient means acting to impart a return stroke to said member, and a full-time secondary pump connected into the chamber of the primary pump but having a lesser displacing capacity for operating when the control valve is closed to evacuate the chamber to render the primary pump inoperative, said resilient means yielding to permit the movement of the fluid displacing member from the path of the drive part when the chamber is so evacuated, and a common actuator for both pumps.

7. In an accessory system for motor vehicles having an accessory with a control valve, a primary pump having a spring-returned fluid displacing member operable back and forth to actuate the accessory, a drive for the pump having a part moving in a definite path for moving the displacing member against the spring urge, the fluid displacing member of the pump being movable from the active influence of the drive part by a spring counteracting fluid pressure influence, and a secondary pump of relatively smaller displacement operable by said drive part to supply such spring counteracting fluid pressure influence to the primary pump when the accessory is inoperative.

ANTON RAPPL.
ERWIN C. HORTON.

REFERENCES CITED

The following references are of record in the file of this patent:

UNITED STATES PATENTS

| Number | Name | Date |
|---|---|---|
| 476,756 | Mills | June 7, 1892 |
| 1,881,939 | Purdy | Oct. 11, 1932 |
| 1,937,150 | Hueber | Nov. 28, 1933 |
| 2,002,318 | Hueber | May 21, 1935 |
| 2,018,111 | Babitch | Oct. 22, 1935 |
| 2,022,643 | Hueber | Nov. 26, 1935 |